United States Patent
Miyano

[15] 3,696,144
[45] Oct. 3, 1972

[54] 11,15-DIHYDROXY-9-OXOPROSTA-8(12),13-DIENOIC ACIDS AND INTERMEDIATE

[72] Inventor: Masateru Miyano, Morton Grove, Ill. 60053

[73] Assignee: G. D. Searle & Co., Chicago, Ill.

[22] Filed: Nov. 27, 1970

[21] Appl. No.: 93,489

Related U.S. Application Data

[63] Continuation-in-part of Ser. No. 799,965, Feb. 17, 1969, abandoned.

[52] U.S. Cl. ............... 260/514 R, 260/413, 260/520, 260/590, 424/317
[51] Int. Cl. ............................................. C07c 61/36
[58] Field of Search ........................... 260/460, 714

[56] References Cited

UNITED STATES PATENTS 3,558,682   1/1971   Pappo et al. ............... 260/468

*Primary Examiner*—Lorraine A. Weinberger
*Assistant Examiner*—Robert Gerstl
*Attorney*—John M. Brown, John J. Kolano, Elliot N. Schubert, Lowell C. Bergstedt, Sybil Meloy, Walter C. Ramm and Helmuth A. Wegner

[57] ABSTRACT

The utilization of styrylglyoxal and a dialkyl ester of 3-oxoundecane-1,11-dioic acid as starting materials leads to cis- and trans-11,15-dihydroxy-9-oxoprosta-8(12),13-dienoic acids, which exhibit valuable pharmacological properties, e.g. hypotensive, antiulcerogenic and smooth muscle stimulating.

5 Claims, No Drawings

11,15-DIHYDROXY-9-OXOPROSTA-8(12),13-DIENOIC ACIDS AND INTERMEDIATE

This application is a continuation in- part of my copending application Ser. No. 799,965, filed Feb. 17, 1969, now abandoned.

The present invention relates to novel prostanoic acid derivatives characterized by 8(12) and 13 double bonds and, more particularly, with 11,15-dihydroxy-9-oxoprosta-8(12),13-dienoic acids, as represented by the following structural formula

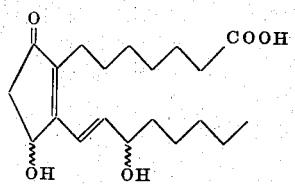

wherein the wavy lines indicate the alternative cis and trans relationship of the hydroxy groups.

A convenient procedure for manufacture of the compounds of this invention utilizes, as starting materials, styrylglyoxal, readily prepared by the selenous acid oxidation of 4-phenyl-3-buten-2-one, and a dialkyl ester of 3-oxoundecane-1,11-dioic acid. Dimethyl 3-oxoundecane-1,11-dioate, for example, is saponified with potassium hydroxide and the resulting dicarboxylic acid is allowed to react with styrylglyoxal, thus affording 14-phenyl-9,12-dioxo-11-hydroxytetradec-13-enoic acid. Cyclization of that acid by means of potassium hydroxide affords 3-hydroxy-5-oxo-2-styryl-cyclopent-1-eneheptanoic acid. Hydroxylation of the double bond with osmium tetroxide followed by cleavage of the resulting glycol, typically with sodium periodate, affords 2-formyl-3-hydroxy-5-oxocyclopent-1-eneheptanoic acid. That aldehyde is allowed to react with hexanoylmethylene triphenyl phosphorane to yield 11-hydroxy-9,15-dioxoprosta-8(12),13-dienoic acid, which upon reduction, typically with sodium borohydride, affords a mixture of the racemic cis-11,15-dihydroxy and trans-11,15-dihydroxy compounds, i.e. 11,15-dihydroxy-9-oxoprosta-8(12),13-dienoic acid. These cis and trans racemates are separated chromatographically.

The compounds of this invention are obtained as racemic mixtures. Resolution of those racemates is conveniently achieved by standard methods utilizing optically active amines such as the *d* or *l* enantiomers of brucine, morphine, quinine, quinidine, strychnine, menthylamine, cinchonine, cinchonidine and α-phenylethylamine. In that manner, trans-11,15-dihydroxy-9-oxoprosta-8(12),13-dienoic acid, for example, is resolved to afford its individual *d* and *l* enantiomers.

The compounds of this invention display valuable pharmacological properties as is evidenced by their anti-ulcerogenic, hypotensive and smooth muscle stimulating activity.

The anti-ulcerogenic property of the instant compounds is demonstrated by their ability to inhibit the ulceration reported by Shay et al., Gastroenterology, 5, 43, (1945), to occur in rats subjected to fasting and pyloric ligation. In this test, male Charles River rats weighing 200–250 g. and fasted 72 hours prior to ligation are used. Immediately following ligation, the prescribed dose of compound, dissolved or suspended in 1.0 ml. of pH 2.0 hydrochloric acid is intragastrically administered to each of a group of six animals. An initial dose of 50 mg. per kg. of body weight is normally employed. A like group of animals to which is identically and concurrently administered the acid alone serves as control. Precisely 19 hours later the stomachs of surviving animals are excised and examined under 5× magnification. The number of ulcers occurring in a non-secretory portion of each stomach is counted in four groups according to size, i.e. less than 2 mm., 2-4 mm., 4-8 mm. and greater than 8 mm. Each rat is then assigned a score, $z$, which is a weighted average of the logarithms of the ulcer counts in several size groups determined by a formula found approximately optimal by discriminant function analysis to be as follows:

$$z = 20.00 \log(N_1 + 1) + 0.22 \log(N_2 + 1) + 46.76 \log(N_3 + 1) + 6.11 \log(N_4 + 1)$$

wherein $N_1 \ldots N_4$ are the observed ulcer counts of the increasing size groups. Since long term studies in approximately 400 animals show that the average $z$ value for controls is 96.2, with a standard error per group of six equal to 18.97, a decrease in the average $z$ score for a given test group, relative to concurrent controls, amounting to 37.5 or more is significant ($P \leq 0.05$); and a compound producing such a decrease is considered anti-ulcerogenic.

For the determination of hypotensive activity the following assay is used:

Male Charles River rats weighing 100–350 g. are anesthetized by intraparitoneal injection of 1.5 g./kg. of urethane, whereupon cardiovascular reflexes are blocked by subcutaneous injection of 3 mg. of atropine sulfate dissolved in 0.3 ml. of aqueous 0.85 percent sodium chloride and sensitization is induced by subcutaneous injection of 5 mg. of pentolinium tartrate dissolved in 1 ml. of aqueous 0.85 percent sodium chloride. The trachea is intubated and both femoral veins and a carotid artery are cannulated, the latter being connected to a calibrated transducer, amplifier and recorder. After surgery, 5 mg./kg. of heparin sodium is introduced via one of the venus cannulae as a 2 percent solution in aqueous 0.85 percent sodium chloride and rectal temperature is adjusted to 35° C. by means of a regulator and external heat source. When the animal's blood pressure and temperature have stabilized, a high and a low dose, with a ratio of high dose to low dose of 2:1, of the test compound and a high and a low dose, also in the ratio of 2:1, of the standard prostaglandin $E_2$ are individually administered intravenously and in a random pattern and the blood pressure measured after each injection. The blood pressure of each animal is permitted to return to normal between successive injections. The relative potency of the test compound compared to the standard prostaglandin $E_2$ is determined by a four point bioassay using a randomized block design. The results are analyzed by the method of C. I. Bliss, The Statistics of Bioassay, Academic Press, New York (1952).

The smooth muscle stimulating property of the compounds of this invention is demonstrated by their activity in each of the following three assays:

A segment of one of the uterine horns of a freshly killed rat is removed after determining that the rat is in the diestrus phase of the ovarian cycle by microscopic examination of a vaginal washing. The segment is mounted in a 2 ml. tissue bath containing de Jalon solution maintained at 37° C. and bubbled with a gaseous mixture of 95 percent oxygen and 5 percent carbon dioxide. Longitudinal contractions of the tissue elicited by 1 mcg./ml. and 2 mcg./ml. of the test compound are measured isotonically and compared to those elicited by 0.1 mcg./ml. and 0.2 mcg./ml. of a standard preparation of prostaglandin $E_2$. The relative potency of the test compound compared to the standard prostaglandin preparation is determined by a four point bioassay using a randomized block design. Results are analyzed by the aforementioned method of Bliss.

In the second assay, a segment of duodenum from a freshly killed rabbit is mounted in a 4 ml. tissue bath containing Tyrode solution maintained at 37° C., through which is bubbled a gaseous mixture of 95 percent oxygen and 5 percent carbon dioxide. Longitudinal contractions of the tissue educed by 0.625 mcg./ml. and 1.25 mcg./ml. of the test compound are measured isotonically and compared to those educed by 0.025 mcg./ml. and 0.05 mcg./ml. of a standard preparation of prostaglandin $E_2$. The relative potency of the test compound compared to that of the standard is determined by a four point bioassay using a randomized block design and results are analyzed by the aforementioned method of Bliss.

In the third assay, a segment of distal ileum from a freshly killed guinea pig is mounted in a 2 ml. tissue bath containing modified Tyrode solution with one-half of the usual concentration of magnesium ions. The temperature is maintained at 37° C. and the solution is bubbled with a gaseous mixture of 95 percent oxygen and 5 percent carbon dioxide. Longitudinal contraction of the tissue elicited by 5 mcg./ml. and 10 mcg./ml. of the test compound are measured isotonically and compared to those elicited by 0.05 mcg./ml. and 0.1 mcg./ml. of a standard preparation of prostaglandin $E_2$. The relative potency of the test compound is determined by the procedure of Bliss described above.

Catalytic hydrogenation of the instant compounds results in saturation of the 8(12) and 13 olefinic linkages, thus affording the prostanoic acid derivatives of the following formula

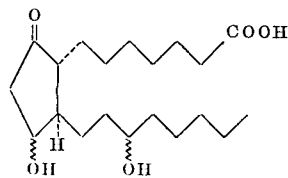

wherein the wavy lines indicate the alternative cis and trans relationship of the hydroxy groups. As a specific example, trans-11,15-dihydroxy-9-oxoprosta-8 (12),13-dienoic acid is hydrogenated in the presence of a 5 percent palladium-on-carbon catalyst to afford trans-11,15-dihydroxy-9-oxoprostanoic acid. The compounds encompassed by the latter formula similarly are valuable pharmacological agents. They possess, for example, hypotensive activity, as is demonstrated in the assay described hereinbefore.

The invention will appear more fully from the examples which follow. These examples are given by way of illustration only and are not to be construed as limiting the invention either in spirit or in scope since it will be apparent to those skilled in the art that many modifications both in materials and methods may be practiced without departing from the purpose or intent of this disclosure. Throughout these examples temperatures are given in degrees Centigrade (°C.) and relative amounts of materials in parts by weight except as otherwise noted.

EXAMPLE 1

A solution containing 100 parts of 4-phenyl-3-buten-2-one, 106 parts of selenous acid, 160 parts of dioxane and 20 parts of water is heated to the reflux temperature. After the initial vigorous reaction has subsided, the mixture is heated at that temperature for an additional 30 minutes. The supernatant is then decanted from the metallic selenium and is concentrated under reduced pressure. Distillation of the residue under reduced pressure affords styrylglyoxal, boiling at about 120° at 2.5 mm. pressure.

EXAMPLE 2

A solution of 38.2 parts of dimethyl 3-oxoundecane-1,11-dioate in 200 parts by volume of 10 percent aqueous potassium hydroxide is stored at 0°–5° for about 3 days, then is adjusted to pH 5 by the addition of concentrated aqueous citric acid. To that mixture is added a solution which is prepared by heating 21.9 parts of styrylgyloxal in 50 parts by volume of 50 percent aqueous methanol at 65°–75° for about 20 minutes, then adding 60 parts of methanol. To the resulting reaction mixture is added 30 parts by volume of 1 M pH 4.5–5.0 citrate buffer and stirring at room temperature is continued for about 3 hours, during which time carbon dioxide gas is evolved. The precipitated product is collected by filtration, thus affording the half potassium salt of 14-phenyl-9,12-dioxo-11-hydroxytetradec-13-enoic acid, melting at about 105°. Further purification by recrystallization from methanol affords the pure compound, melting at about 107.5°.

The latter half potassium salt is dissolved in water and the resulting aqueous solution is acidified by the addition of dilute hydrochloric acid. The resulting acidic mixture is extracted with ether and the ether layer is separated, washed with water, dried over anhydrous sodium sulfate and concentrated to dryness. The resulting solid residue is purified by recrystallization from chloroform-ether to yield 14-phenyl-9,12-dioxo-11-hydroxytetradec-13-enoic acid, melting at about 81.5°–83°.

EXAMPLE 3

To 3,000 parts by volume of an aqueous solution containing 6.7 parts of potassium hydroxide is added, with stirring at about 21°–23° over a period of about 2 ¼ hours, a solution of 10.4 parts of 14-phenyl-9,12-dioxo-11-hydroxytetradec-13-enoic acid in 187 parts of chloroform. After completion of the addition, the reaction mixture is stirred for an additional 2 hours, then is made acidic by adding 10 parts of oxalic acid dihydrate. The acidic mixture is extracted with chloroform and the organic layer is washed with dilute aqueous sodium chloride, then dried over anhydrous sodium sulfate and concentrated to dryness under reduced pressure. The resulting residue is recrystallized first from benzene, then from chloroform-ether to yield 3-hydroxy-5-oxo-2-styrylcyclopent-1-eneheptanoic acid, which displays a melting point at about 118°. This compound exhibits an ultraviolet absorption maximum at about 325 millimicrons with a molecular extinction coefficient of about 36,400.

EXAMPLE 4

A mixture consisting of 13 parts of 3-hydroxy-5-oxo-2-styrylcyclopent-1-eneheptanoic acid, 17.8 parts of sodium periodate, 55 parts of water, 160 parts of dioxane and 2 parts of a 2 percent osmium tetroxide in dioxane solution is stirred under nitrogen at room temperature for about 4 hours. The reaction mixture is then extracted with ether and the ether layer is separated and extracted several times with 0.5 percent aqueous sodium chloride. The salt extracts are saturated with sodium chloride, then extracted with ether. The ether layer is separated, dried over anhydrous sodium sulfate, then concentrated under reduced pressure to afford 2-formyl-3-hydroxy-5-oxocyclopent-1-eneheptanoic acid, characterized by an ultraviolet absorption maximum at about 228 millimicrons with a molecular extinction coefficient of about 10,100.

EXAMPLE 5

To a solution of 10.2 parts of 2-formyl-3-hydroxy-5-oxocyclopent-1-eneheptanoic acid in 200 parts of dioxane is added 4 parts of triethylamine and the resulting mixture is stripped of excess triethylamine by distillation under reduced pressure. The resulting residue is dissolved in 210 parts of dioxane. To that dioxane solution is then added 15.3 parts of hexanoylmethylene triphenyl phosphorane dissolved in 396 parts of benzene. The resulting reaction mixture is heated at the reflux temperature under nitrogen for about 18 hours, then is cooled, washed with aqueous oxalic acid and extracted with aqueous potassium bicarbonate. That alkaline extract is washed with ether, then acidified with oxalic acid and extracted with ether. The ether extract is washed with aqueous sodium chloride, dried over anhydrous sodium sulfate and concentrated to dryness under reduced pressure to afford the crude product, which is purified by dry column chromatography on silica gel containing 8 percent of water, using 4 percent methanol in benzene, or by chromatography on silica gel and elution with 40 percent ethyl acetate in benzene, thus affording 11-hydroxy-9,15-dioxoprosta-8(12),13-dienoic acid, characterized by an ultraviolet absorption maximum at about 291 millimicrons with a molecular extinction coefficient of about 21,900.

EXAMPLE 6

To a solution of 12 parts of 11-hydroxy-9,15-dioxoprosta-8(12),13-dienoic acid in 28 parts of ethanol, cooled to 0°–5°, is added dropwise a solution of 3 parts of triethylamine in 275 parts of water. To that mixture is added dropwise with cooling and stirring a solution of 0.32 part of sodium borohydride in 32 parts of water. Stirring at approximately 10° is continued for about 25 minutes, at the end of which time the reaction mixture is poured carefully into excess aqueous citric acid. Extraction with ether affords an organic solution, which is washed with water, dried over anhydrous sodium sulfate and concentrated under reduced pressure to afford 11,15-dihydroxy-9-oxoprosta-8(12),13-dienoic acid. This mixture of epimeric 11-hydroxy compounds is separated by chromatography on silica gel, using 25–50 percent ethyl acetate in benzene mixtures as the eluant. The 40 percent ethyl acetate in benzene eluant yields successively cis-11,15-dihydroxy-9-oxoprosta-8,12(13)-dienoic acid and trans-11,15-dihydroxy-9-oxoprosta-8,12(13)-dienoic acid. Further purification is achieved by partition chromatography on silicic acid, wherein the solvents are prepared by shaking together 500 parts by volume of methanol, 200 parts by volume of distilled water and 1,500 parts by volume of benzene. The lower layer is used as the stationary phase and the upper layer as the eluant. Successive elutions of the column with that eluant affords first trans-11,15-dihydroxy-9-oxoprosta-8(12),13-dienoic acid, which exhibits an ultraviolet absorption maximum at about 276 millimicrons with a molecular extinction coefficient of about 26,500, then cis-11,15-dihydroxy-9-oxoprosta-8(12),13-dienoic acid, exhibiting an ultraviolet absorption maximum at about 276 millimicrons with a molecular extinction coefficient of about 27,800.

EXAMPLE 7

To a solution of 0.96 part of cis-11,15-dihydroxy-9-oxoprosta-8(12),13-dienoic acid in 40 parts of isopropyl alcohol is added 0.2 part of 5 percent palladium-on-carbon catalyst and the resulting mixture is shaken with hydrogen under 40–52 pounds per square inch pressure at about 53° for approximately 48 hours. The catalyst is then removed by filtration and the filtrate is concentrated to dryness under reduced pressure. The resulting residue is dissolved in 480 parts of 95 percent ethanol containing 30 parts of potassium acetate and that mixture is kept at room temperature for about 95 hours. At the end of that time the solvent is removed by distillation under reduced pressure and the resulting residue is dissolved in approximately 400 parts of water. That aqueous solution is acidified with citric acid to pH 3.5, then is extracted with ether. That organic solution is washed with dilute aqueous sodium chloride, then dried over anhydrous sodium sulfate and concentrated under reduced pressure. The resulting crude product is purified by partition chromatography on silicic acid, wherein the solvents are prepared by shaking together 1,500 parts by volume of benzene, 500 parts by volume of methanol and 200 parts by volume of water. The lower layer is used as the stationary phase and the upper layer as the eluant. Elution of the column in that manner affords successively dl-11$\beta$,15(R)-dihydroxy-9-oxoprostanoic acid and dl-11$\alpha$,15(S)-dihydroxy-9-oxoprostanoic acid.

EXAMPLE 8

A mixture containing 1.16 parts of trans-11,15-dihydroxy-9-oxoprosta-8(12),13-dienoic acid, 40 parts of isopropyl alcohol and 0.2 part of 5 percent palladium-on-carbon catalyst is shaken with hydrogen under 38–52 pounds per square inch pressure at about 50° for approximately 48 hours, then is concentrated to dryness under reduced pressure. The resulting residue is contacted with a solution of potassium acetate in 95 percent ethanol according to the procedure described in Example 7, and the product is isolated from that mixture by the procedure described in that Example. Purification of that crude product by partition chromatography in the manner described in Example 7 results in, successively, dl-11β,15(S)-dihydroxy-9-oxoprostanoic acid and dl-11α,15(R)-dihydroxy-9-oxoprostanoic acid.

What is claimed is:

1. A compound of the formula

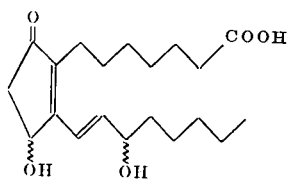

2. As in claim 1, the compound which is 11,15-dihydroxy-9-oxoprosta-8(12),13-dienoic acid.

3. As in claim 1, the compound which is cis-11,15-dihydroxy-9-oxoprosta-8(12),13-dienoic acid.

4. As in claim 1, the compound which is trans-11,15-dihydroxy-9-oxoprosta-8(12),13-dienoic acid.

5. 11-Hydroxy-9,15-dioxoprosta-8(12),13-dienoic acid.

* * * * *